United States Patent
Schultz et al.

(10) Patent No.: US 6,840,404 B1
(45) Date of Patent: Jan. 11, 2005

(54) METERING SYSTEM & METHODS

(75) Inventors: Carl L. Schultz, Plymouth, MI (US); Scott A. Dittmer, New Hudson, MI (US)

(73) Assignee: Sealant Equipment & Engineering, Inc., Plymouth, MI (US)

(*) Notice: Subject to any disclaimer, the term of this patent is extended or adjusted under 35 U.S.C. 154(b) by 295 days.

(21) Appl. No.: 09/875,564

(22) Filed: Jun. 6, 2001

Related U.S. Application Data

(60) Provisional application No. 60/274,277, filed on Mar. 8, 2001.

(51) Int. Cl.[7] .................................................. B67D 5/08
(52) U.S. Cl. ........................... 222/61; 222/137; 222/276
(58) Field of Search ........................... 222/61, 63, 137, 222/145.5, 318, 333, 276, 145.6

(56) References Cited

U.S. PATENT DOCUMENTS

| | | | |
|---|---|---|---|
| 2,946,488 A | * | 7/1960 | Jraft ............................ 222/134 |
| 4,136,708 A | * | 1/1979 | Cosentino et al. ............ 137/99 |
| 4,756,625 A | | 7/1988 | Schultz |
| 4,951,843 A | | 8/1990 | Paetow |
| 5,217,146 A | * | 6/1993 | Neff et al. .................. 222/134 |
| 5,524,797 A | | 6/1996 | Schultz |
| 5,536,151 A | * | 7/1996 | von Eckardstein .......... 417/429 |
| 5,979,794 A | | 11/1999 | DeFillipi et al. |
| 5,992,696 A | | 11/1999 | Schultz et al. |
| 6,062,492 A | | 5/2000 | Tudor et al. |

OTHER PUBLICATIONS

I & J Fisnar, Inc. Product Catalog, 1999 Meter, Mix & Dispense Systems.

* cited by examiner

*Primary Examiner*—Philippe Derakshani
(74) *Attorney, Agent, or Firm*—Rader, Fishman & Grauer PLLC

(57) ABSTRACT

A metering system for controlling the flow of a fluid is disclosed. The metering system comprises a metering device, two input valves that actively control flow of fluid into the metering device, and two output valves that actively control flow of fluid from the metering device. The input and output valves are selectively opened and closed to cause metered amounts of fluid to be dispensed from the metering device through the output valves.

36 Claims, 4 Drawing Sheets

METERING SYSTEM & METHODS

RELATED APPLICATION

This application claims priority to U.S. Provisional Application No. 60/274,277 filed on Mar. 8, 2001, the contents of which are incorporated herein in its entirety.

FIELD OF THE INVENTION

The present invention relates generally to the field of metering and dispensing equipment, and more specifically to a valve-controlled metering system and method.

BACKGROUND OF THE INVENTION

Metering systems generally provide a controlled flow of fluid from a fluid reservoir. Various metering systems are known in the art for controlling and metering the flow of fluids, such as sealants, adhesives, epoxies, and the like. It is also known to combine two or more metering systems together to control the flow of two or more component fluids so that they are mixed together in a pre-determined ratio. These types of mixing systems are commonly used in various industries to mix and dispense two-component fluids, such as epoxies, which, for example, may comprise a catalyst fluid and a resin fluid that must be mixed in a pre-determined ratio.

FIG. 4 schematically illustrates a known mixing system, comprised of two metering systems 400 and 401, for mixing two component fluids in a pre-determined ratio and dispensing the mixed fluid. With respect to metering system 400, a first component fluid is stored in a first fluid reservoir or container 351. A pump 353 causes the fluid to flow through input conduit 303. Valves 301A and 301B control the flow of the first fluid into a metering cylinder 311. A piston 309 is slidably disposed in the cylinder 311. Input valves 301A and 301B are three-way valves that have three mutually-exclusive modes of functionality. For illustration purposes, these three modes are described in connection with valve 301A. First, the valve can be turned off, which prevents fluid from flowing through the valve in any direction. Second, valve 301A can permit fluid to flow from input conduit 303 through conduit 302A and into metering cylinder 311. Third, the valve 301A can permit fluid to flow from metering cylinder 311 into output conduit 304A. The valve mode is controlled by valve operator 310A. The functionality of valve 301B is identical to valve 301A. Generally, when valve 301A permits fluid to flow into metering cylinder 311, valve 301B allows fluid to flow from the metering cylinder 311 into the output conduit 304B. During this mode of valve operation, piston 309 is moving from left to right (in FIG. 3) to force fluid from the right side of the metering cylinder 311 into output conduit 304B and provide additional volume on the left side of cylinder 311 for the fluid coming in through valve 301A. When piston 309 reaches the right end of cylinder 311, piston 309 switches direction. Valve 301A changes mode to permit fluid to flow from the left side of cylinder 311 into output conduit 304A, and valve 301B changes mode to permit fluid to flow from input conduit 303 into the right side of cylinder 311.

Two of the described metering systems can be used together to mix two component fluids into a single mixed fluid, as shown in FIG. 3. Metering system 401 is identical in assembly and operation to metering system 400. The first component fluid flowing through output conduit 305 is mixed with the second component fluid flowing through conduit 306 in a mixer device (not shown), and the mixed fluid is dispensed therefrom. The output fluid can be applied to a variety of work pieces, such as automobiles and automobile components for example. By varying the relative sizes of the metering cylinders 311 and 312, the two component fluids can be mixed in a pre-defined ratio. Similarly, multiple metering systems can be used together, as described above, to meter and mix three, four, or five part fluids into a single mixed fluid.

The inventor hereof has recognized that the above-described metering and mixing system lacks operational flexibility. Specifically, the use of three-way valves 301A and 301B do not allow the system to control the flow of fluid with utmost flexibility and robustness. Further, the inventor has recognized that the use of three-way valves in metering systems is not optimal for some applications, such as for metering fluids having abrasive particles, particularly at high pressures, because they do not wear as well as two-way valves. Further, the inventor has recognized that the use of three-way valves in metering systems that dispense fluids at high pressures is not optimal because the high fluid pressure tends to force the plastic casing of the valves away from the valve ball, thereby allowing fluid to pass through the valve even when the valve is in its "off" position. Accordingly, the inventor has developed a new metering and mixing system that provides more operational flexibility, as well as more resistance to wear, than known metering and mixing systems.

SUMMARY OF THE INVENTION

The present invention is a metering system comprising a metering device, two input valves, and two output valves. Preferably, the valves are two-way valves having an "open" position and a "closed" position. The input valves selectively control the flow of a fluid into the metering device, and the output valves selectively control the flow of the fluid from the metering device. During normal operation of the system, only one of the input valves permits flow of the fluid into the metering device at a time, and only one of the output valves permits flow of the fluid out of the metering device at a time. Preferably, the metering device is a metering container having a pre-defined volume, such as a cylinder, having a piston slidably disposed therein. The piston moves within the cylinder from one side to the other to force fluid on one side of the piston out through the open output valve while creating more volume on the other side of the cylinder, where an open input valve permits fluid to flow into the cylinder. Preferably, the piston reciprocates within the cylinder, as the input and output valves open and close in a manner to facilitate the inflow and outflow of metered fluid from the cylinder. Multiple metering systems can be combined together for the purpose of metering multiple component fluids and mixing them together in a pre-defined ratio. Further, the input and output valves of each of the metering systems can be independently controlled to perform various functions, such as pre-positioning the piston within the cylinder and purging the system. The ability to independently control two input valves and two output valves per metering system increases the operational flexibility of the system.

DETAILED DESCRIPTION OF A PREFERRED EMBODIMENT OF THE INVENTION

Figure 1:
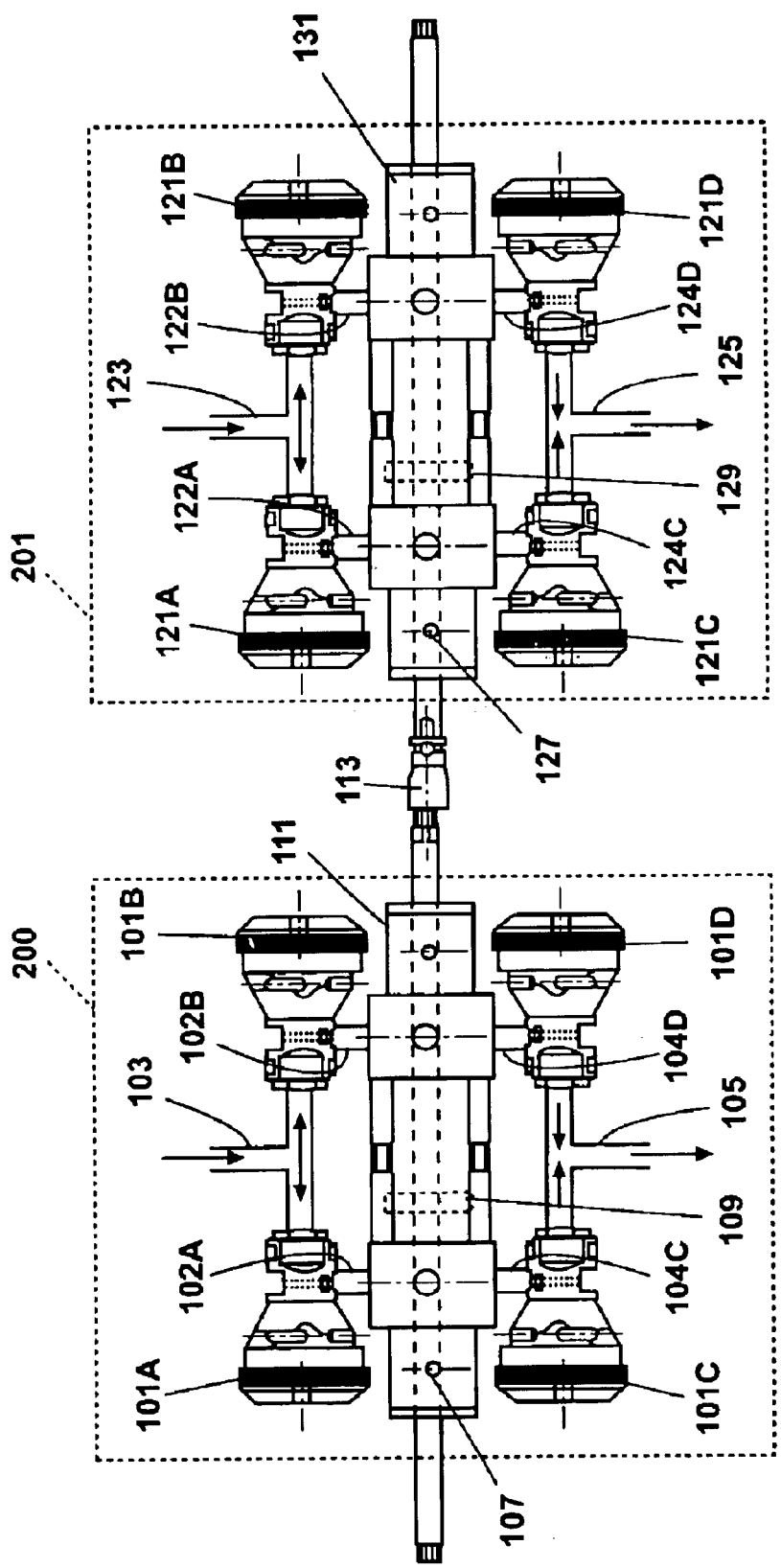
FIG. 1 illustrates a preferred embodiment of the invention.
Figure 2:
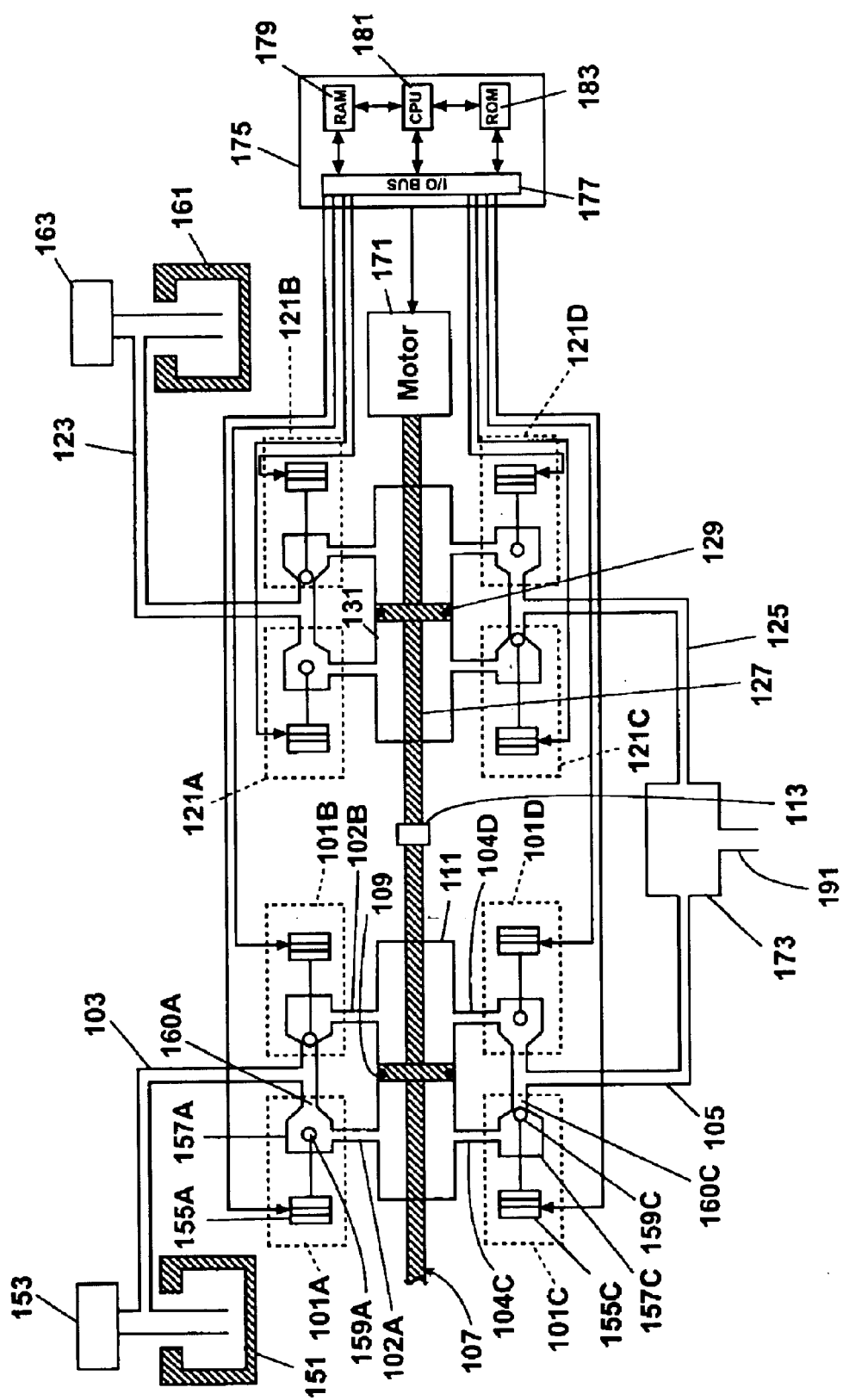
FIG. 2 is a schematic rendition of a preferred embodiment of the invention.

Referring now to FIGS. 1 and 2, a preferred embodiment of the present invention is now described. FIG. 1 sets forth a relatively realistic rendition of a preferred embodiment of the metering and mixing system of the invention. FIG. 2 illustrates the same preferred embodiment of the invention in a schematic format and sets forth additional details of a preferred embodiment of the invention. Like components are labeled with identical numbers in both Figures.

The present invention relates to a system for metering and mixing a variety of fluids, such as sealants, adhesives, and epoxies. In the illustrated preferred embodiment of the invention; the fluid is comprised of two distinct component fluids, such as a resin fluid and a catalyst fluid, which are independently metered in a pre-determined ratio to each other and then mixed together before being dispensed. The two component fluids are initially stored in respective storage containers 151 and 161 (shown in FIG. 2), such as fluid drums. For illustration purposes, it is assumed that a catalyst fluid is stored in container 151 and a resin is stored in container 161. Fluid pumps 153 and 163 are used in connection with containers 151 and 161, respectively, to pump the catalyst fluid and resin fluid stored in containers 151 and 161 through conduits 103 and 123. Conduits 103 and 123 provide the catalyst and resin fluids to parallel metering systems 200 and 201, which are both generally comprised of a metering cylinder and piston, and various valves. The parallel metering systems 200 and 201 are similar in assembly and operation.

The metering system 200 primarily includes two input valves 101A and 101B, two output valves 101C and 101D, and a metering device 111, which in a preferred embodiment of the invention comprises a metering cylinder 111 having a metering piston 109 slidably disposed therein. Input valves 101A and 101B are both in fluid communication with input conduit 103. Input valves 101A and 101B are preferably two-way valves, having an "open" state and a "closed" state. When input valve 101A is open, fluid is permitted to flow from input conduit 103 through valve 101A and conduit 102A and into the metering cylinder 111. When input valve 101A is closed, no fluid is permitted to flow through conduit 102A. Similarly, when input valve 101B is open, fluid is permitted to flow from conduit 103 through conduit 102B and into metering cylinder 111. When input valve 101B is closed, no fluid is permitted to flow through conduit 102B. When the invention is used for the purpose of metering the catalyst fluid dispensed from container 151, input valve 101A is generally closed when input valve 101B is open, and vice versa.

A metering piston 109 is slidably disposed within metering device 111. Metering piston 109 includes piston shaft 107, which is rigidly connected to piston shaft 127 of the parallel metering system 201 by coupling 113. The pistons 109 and 129 reciprocate inside of their respective cylinders 111 and 131 in a tandem fashion. The reciprocation of the pistons may be caused by various methods that are known in the art. For example, the relative difference in fluid pressure on opposite sides of the pistons causes the pistons to move within their respective cylinders. Specifically, the piston will tend to move in the direction having a lower fluid pressure. Thus, as is known in the art, reciprocation of the pistons is achieved by controlling the supply pumps 153 and 163 and the input and output valves to control the fluid pressure on opposite sides of the respective cylinders 111 and 131. Though the relative fluid pressures can be used alone to control the reciprocation of the pistons 109 and 129, a motor 171 is also preferably employed to control the pistons. The motor actuates the pistons in response to a control signal from an electronic controller 175. Other known systems for actuating the pistons 109 and 129 can similarly be used in connection with the present invention, such as ball screw drives and hydraulic or air-controlled cylinders. The use of a motor 171, or other device, to assist in controlling movement of the metering pistons 109 and 129 is advantageous because it facilitates more precise dispensing of the fluid than when the differential pressures caused by the fluid pumps 153 and 163 is the sole method of controlling the metering pistons 109 and 129.

Controller 175 is preferably any type of electronic controller that is capable of providing operational control signals to electronically-controlled components. Preferably, controller 175 includes random access memory (RAM) 179, read only memory (ROM) 183, a central processing unit (CPU) 181, and an input/output bus (I/O Bus) 177, which provides control signals to the motor 171 and each of the valves in the system.

Output valves 101C and 101D are in fluid communication with the metering cylinder 111 via conduits 104C and 104D, respectively. Like input valves 101A and 101B, output valves 101C and 101D are preferably two-way valves, having an "open" state and a "closed" state. When output valve 101C is open, catalyst fluid that is in the metering cylinder 111 on the left side of metering piston 109 is permitted to flow from conduit 104C through output valve 101C and into output conduit 105. When output valve 101D is closed, no fluid is permitted to flow through valve 101C. Similarly, when output valve 101D is open, fluid is permitted to flow from conduit 104D through output valve 104D and into output conduit 105. When output valve 101D is closed, no fluid is permitted to flow through valve 101D. When the invention is used for the purpose of metering the catalyst fluid dispensed from container 151, output valve 101C is generally closed when output valve 101D is open, and vice versa.

Catalyst fluid that flows through either output valve 101C or 101D is channeled through output conduit 105 into mixer unit 173. The mixer unit also receives resin fluid from the parallel metering system 201 through output conduit 125. The catalyst fluid and the resin fluid are mixed together in mixer unit 173, and the mixture is dispensed through output conduit 191. Mixer unit 173 can take several forms, including a well-known mix dispensing tube.

Two-way valves 101A, 101B, 101C, and 101D are preferably air-powered two-way ball valves. Referring to input valve 101A (FIG. 2) for illustration purposes, a preferred two-way ball valve includes an air-powered actuator 155A that moves a ball 159A inside of a valve housing 157A between an open and closed position in response to a control signal from controller 175. Valve 101A is shown in an open position in FIG. 2, wherein the ball 159A is pulled away from the mouth 160A of valve 101A, thereby permitting fluid communication between input conduit 103 and conduit 102A. In contrast, valve 101C is shown in a closed position in FIG. 2, wherein ball 159C is seated in the mouth 160C of valve 101C, thereby precluding fluid communication between conduit 104C and output conduit 105. It is preferable to use two-way ball valves in the present invention because the manner in which they open and close does not involve two surfaces sliding against each other, as in various other types of valves, such as in a conventional rotary ball valve. As a result, air-assisted ball valves wear better when the fluid being metered includes suspended abrasive particles. Specifically, the abrasive particles do not cause "scoring" of surfaces that slide relative to each other, as with conventional rotary ball valves. Further, air-assisted ball valves tend to seal better when applied to fluids having abrasive particles, since the pressure of the fluid behind the ball assists in forcing the ball against the mouth of the valve and can effectively crush abrasive materials that may be lodged between the ball and the valve mouth. Thus, the preferred two-way ball valves function better in high-pressure applications than some other valves, such as three way valves, where the high-pressure fluid tends to deform the plastic casing, causing the valve to fail. While two-way air-assisted ball valves are preferred in the invention, other types of two-way valves, including two-way rotary ball valves, can be used in connection with this invention to achieve acceptable results.

The assembly of the present invention has been described with reference primarily to metering system 200, which meters a first part of a two-part fluid, i.e., a catalyst in this example. Metering system 201 meters a second part of the two-part fluid, i.e., a resin fluid in this example. Metering system 201 is preferably identical to metering system 200. Therefore, a detailed description of metering system 201 will not be given. In general, metering system 201 receives resin fluid from input conduit 123. Input valves 121A and 121B, in response to control signals from electronic controller 175, regulate resin fluid flowing into metering cylinder 131. Output valves 121C and 121D are in fluid communication with metering cylinder 131. Output valves 121C and 121D, in response to control signals from electronic controller 175, regulate the flow of resin fluid through output conduit 125 and into mixer device 173. Metering cylinders 111 and 131 are sized such that they provide a pre-determined ratio of their component fluids as the respective metering pistons slide from one side of the cylinders to the other. For example, if it is desirable to mix resin and catalyst fluids in a ratio of three parts resin and one part catalyst, the resin cylinder 131 would have a volume three times larger than the catalyst cylinder 111.

Various preferred methods of operating the invention are now disclosed. A first preferred method of operating the invention is referred to as "normal operation." During normal operation, a goal is to accurately meter a specified amount of the first component fluid (i.e., the catalyst) and a specified amount of the second component fluid (i.e., the resin) in a pre-determined proportion to each other. The metered catalyst fluid and resin fluid are then mixed together and dispensed. In particular, catalyst fluid is drawn from container 151 through conduit 103. The catalyst fluid fills the metering cylinder on one side of the metering piston or the other, depending upon which of input valves 101A or 101B is open. As stated previously, during normal operation, when controller 175 causes input valve 101A to be closed, the controller causes input valve 101B to be open, and vice versa. With input valve 101A open and input valve 101B closed, as shown in FIG. 2, catalyst fluid flows into the metering cylinder 111 on the left side of metering piston 109. When input valve 101A is open, the metering piston 109 slides in the metering cylinder 111 toward the right, thereby increasing the available volume in the metering cylinder on the left side of the metering piston and decreasing the available volume in the metering cylinder on the right side of the piston. The movement of the piston is caused by an increase in pressure on the left side of the piston (because of valve 101A being opened and pump 153 pumping fluid into conduit 103) and a decrease in pressure on the left side of the piston (because of valve 101D being opened, allowing fluid to flow into conduit 104D). The piston movement is preferably also assisted and controlled by motor 171. The movement of the metering piston to the right applies pressure to catalyst fluid contained in the metering cylinder on the right side of the piston. The increased pressure causes the catalyst fluid to flow into conduit 104D. Under these conditions, electronic controller 175 causes output valve 101D to be open, thus allowing catalyst fluid to flow therethrough and into output conduit 105. This condition of normal operation (i.e., valves 101A and 101D open, valves 101B and 101C closed, and piston 109 moving from left to right) is referred to as "state A."

Because metering shaft 107 of metering system 200 is rigidly coupled to metering shaft 127 of metering system 201, metering piston 129 moves from left to right in cylinder 131 in tandem with piston 109 during state A operation. Thus, resin fluid is drawn through input conduit 123 through open input valve 121A and into the left side of cylinder 131. Further, resin fluid already contained in cylinder 131 is pushed out of the cylinder through open output valve 121D into output conduit 125. The metered resin fluid is then mixed with the catalyst fluid in mixer 3.

After all of the metered catalyst and resin are released from the right sides of their respective metering cylinders, the direction of the pistons 109 and 129 is reversed. Concurrently, the controller 175 causes input valves 101A and 121A to close and input valves 101B and 121B to open. Similarly, controller 175 causes output valves 101C and 121C to open and output valves 101D and 121D to close. This operation causes the resin and catalyst fluids contained in the left sides of their respective cylinders to flow into the mixer 173. The above-described method of opening and closing the various valves in connection with reciprocating the piston stroke is repeated. Specifically, the controller 175 causes the metering systems 200 and 201 to continuously alter between state A and state B in tandem.

During normal operation of the invention, it is undesirable to pass an unmetered amount of resin or catalyst into the mixer 173. To prevent such a condition, it is preferable to ensure that the input valve and the output valve on the same side of the same cylinder are not both open at the same time, which is referred to as a "straight through" condition. Because there is a finite time delay between a "closed" state of a valve and an "open" state of a valve, it is preferable for the controller 175 to sequence the opening and closing of valves so as to prevent a straight through condition. One skilled in the art, in light of this disclosure, will recognize various methods for such valve sequencing. A preferred method of sequencing the valves involves the controller 175 delaying the process of opening the closed valves for a finite time period after it begins closing the open valves to ensure that input and output valves on the same side of the same metering cylinder are not open at the same time. For example, when the controller 175 determines that it is desirable to switch from a state A (valves 101A and 101D open, and valves 101B and 101C closed) to a state B (valves 101A and 101D closed, and valves 101B and 101C open), the controller causes valves 101A and 101D to begin closing. However, instead of immediately opening valves 101B and 101C, the controller maintains valves 101B and 101C closed for a certain delay period, which is sufficient to ensure that valves 101A and 101D are completely closed before beginning to open valves 101B and 101C. During this delay period, controller 175 also preferably maintains the metering piston 109 stationary until valves 101B and 101C are opened. An identical valve sequencing approach is preferably used for metering system 201.

The above-described assembly and method, wherein fluid is alternatively allowed to flow into the metering cylinder 111 on both sides of the metering piston 109 (i.e., a "double-acting" metering system) is advantageous because it eliminates the time required to "reload" the cylinder 111 with fluid, as is required in a system wherein fluid is only allowed to flow into the metering cylinder on one side of the metering piston (i.e., a "single-acting" metering system). Specifically, in a double-acting system, as described above, one side of the metering cylinder is being "loaded" with fluid while the fluid in the other side of the cylinder 111 is being dispensed. Eliminating the "reload" time increases the efficiency with which the system can apply metered fluid to work pieces.

The present invention further facilitates a second mode of operation, referred to as a "purge mode". During purge mode operation, the controller 175 causes all eight valves in the system to open simultaneously to create "straight through" conditions on both sides of both of the metering pistons 109 and 129. The pistons 109 and 129 are held stationary during purge mode operation. The straight through conditions allow the fluids (catalyst and resin) to flow freely (unmetered) through the system. When purge mode operation is employed, it is preferable to disconnect output conduits 105 and 125 from the mixer 173 and reroute conduits 105 and 107 such that conduit 105 dispenses its fluid into container 151 and conduit 125 dispenses its fluid into container 161. In this way, the two component fluids (catalyst and resin) are pumped through the system and re-deposited in their original containers. As a result, the fluids can be used to flush the system without wasting the fluids. Further, the purge mode operation can be used to circulate the component fluids to stabilize temperatures and keep particles in the fluids suspended without actuating the metering pistons. Thus, the present invention can be used to continuously circulate the component fluids without causing undue wear and tear to the metering pistons or the motor.

A third mode of operating the invention is referred to as "pre-position mode." During pre-position mode operation, the controller 175 preferably causes the metering pistons 109 and 129 to be positioned at or near the ends of the metering cylinders 111 and 131 prior to the start of a metering stroke of the pistons. The pre-position mode is useful to ensure uniform application of the mixed fluid from mixer 173. For example, to avoid irregularity in the stream of mixed fluid dispensed from the mixer 173, it is preferable that the volume of the metering cylinders 111 and 131 be sufficiently large so that a single application of material can be completed within a single stroke of the metering pistons. That is, the metering pistons 109 and 110 should not have to change directions in the middle of an application. As a result, it is preferable that the metering pistons 109 and 129 be positioned at or near the end of their respective metering cylinders 111 and 131 when a new application is begun to ensure that there will be sufficient volume in the cylinders without having to change direction. One method of accomplishing this result would be to merely continue normal operation of the system until the metering pistons reach the end of their respective metering cylinders, thereby dispensing the mixed fluid as waste. However, this method results in an undesirable waste of materials. Therefore, during pre-position mode operation of the present invention, the controller 175 causes all of the output valves (101C, 101D, 121C and 121D) to be closed, and all of the input valves (101A, 101B, 121A, and 121D) to be open. The controller 175 also causes the metering pistons 109 and 129 to slide toward one end of the respective cylinders. As the metering pistons slide, they force the component fluid from one side of the cylinder to the other. For example, during pre-position operation with the pistons moving from the right to the left, all fluids in the cylinders 111 and 131 on the left side of the pistons 109 and 129 are forced up through input valves 101A and 121A, and over through input valves 101B and 121B into the right sides of cylinders 111 and 131. With all of the output valves (101C, 101D, 121C, and 121D) closed, none of the component fluids can be output to the mixer 173. The pre-position mode of operating the invention facilitates a controlled positioning of the metering pistons 109 and 129 without wasting materials.

Figure 3:
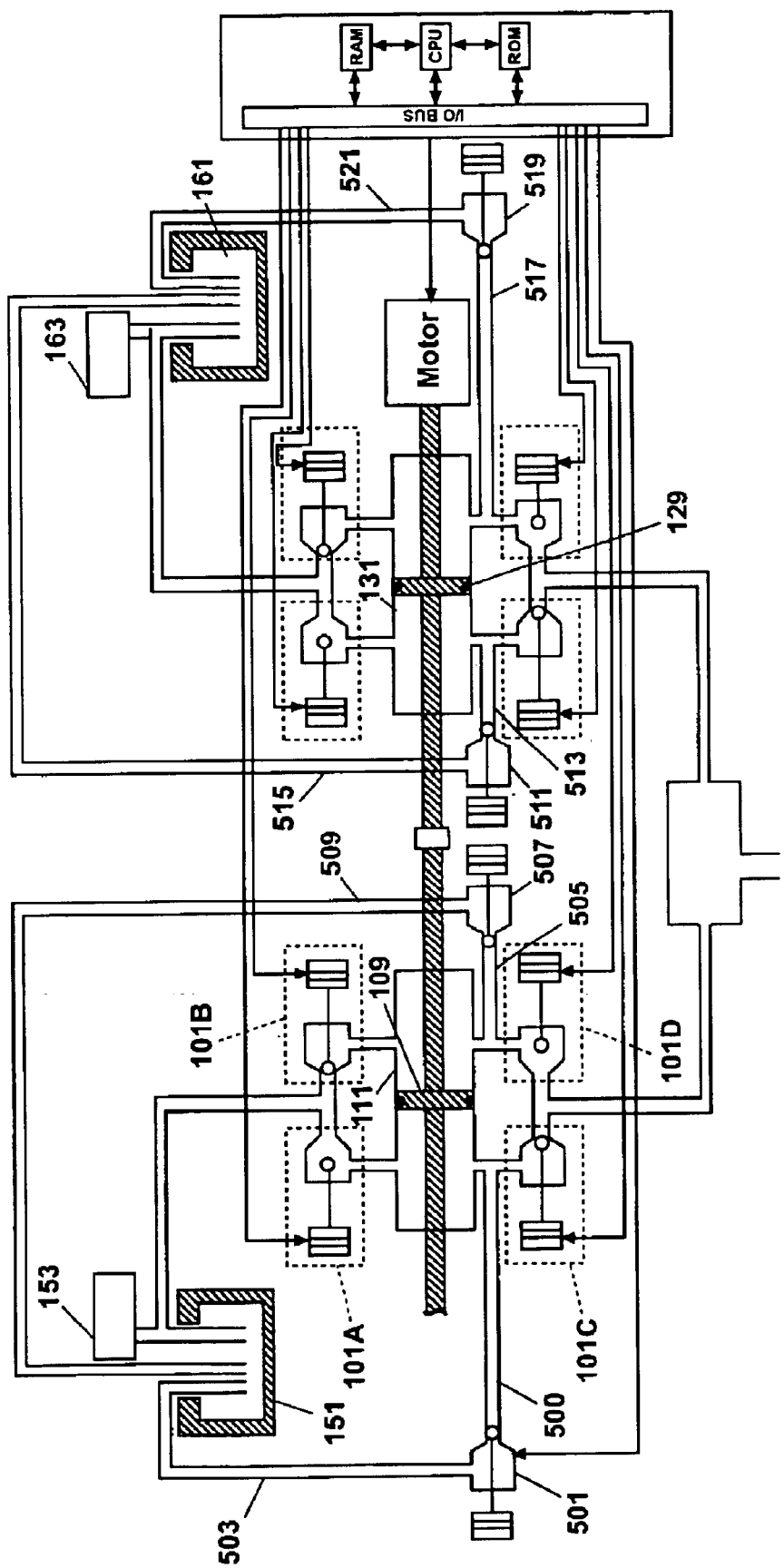
FIG. 3 illustrates an alternative embodiment of the invention.
Figure 4:
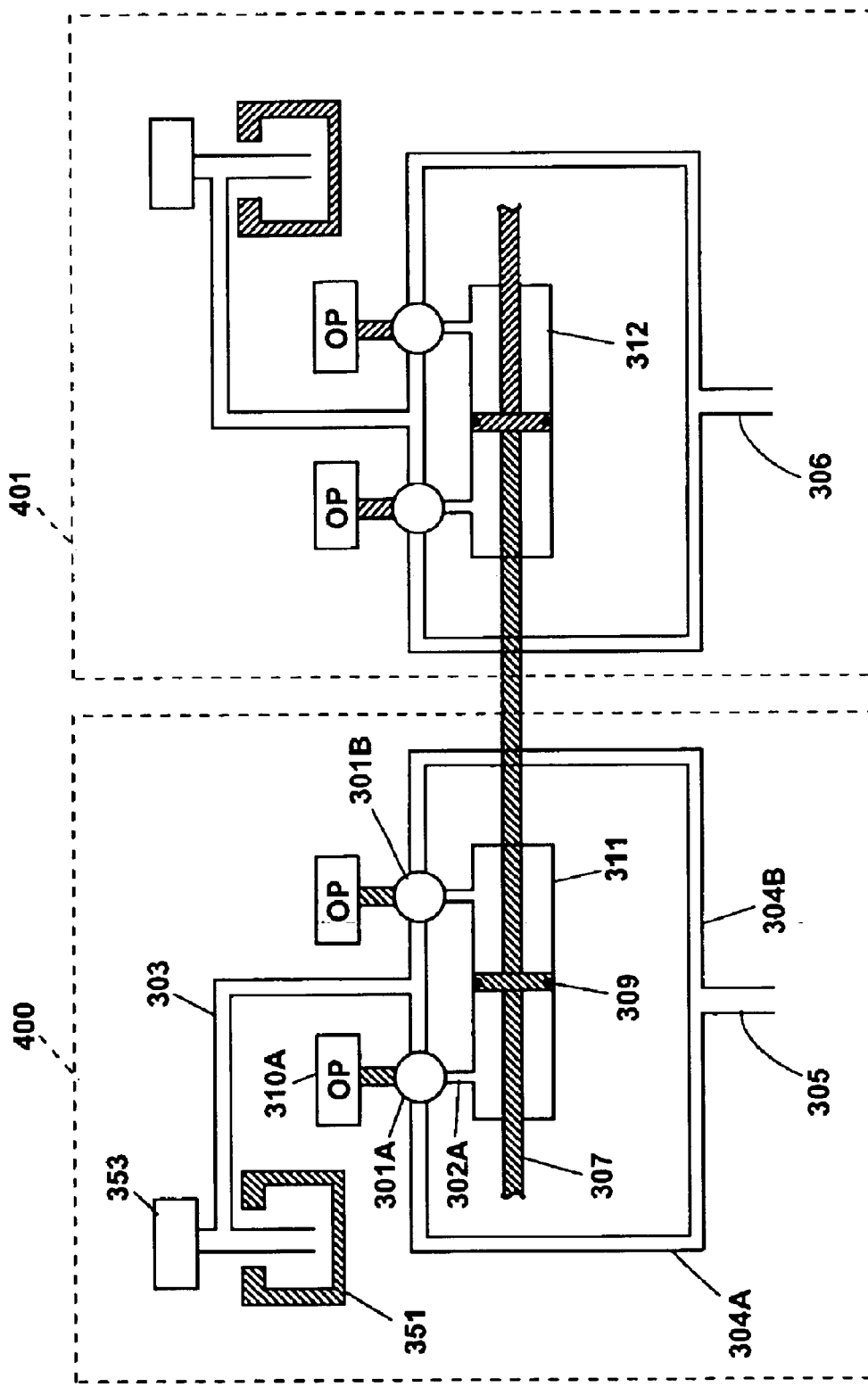
FIG. 4 illustrates a prior art metering and mixing system.

The pre-position mode of operation can also be accomplished by an alternative embodiment of the present invention, as set forth in FIG. 3. The embodiment in FIG. 3 is identical to the embodiment in FIGS. 1 and 2, except that re-circulation conduits and re-circulation valves are added to permit the flow of fluid from the metering cylinders 111 and 131 back to the fluid storage containers 151 and 161. Specifically, re-circulation conduits 500 and 503 are added to facilitate flow of fluid from the left side of cylinder 111, through re-circulation valve 501, to the fluid storage container 151. Re-circulation valve 151 is preferably a two-way valve as described above. Similarly, re-circulation conduits 505 and 509 permit fluid to flow from the right side of cylinder 111, through re-circulation valve 507, to the fluid storage container 151. Re-circulation conduits 513, 515, 517 and 521, along with re-circulation valves 511 and 519, permit fluid to flow from cylinder 131 back to storage container 161. The re-circulation conduits and valves may be used to facilitate pre-positioning of the metering pistons within the respective cylinders 111 and 131.

With reference to cylinder 111, an alternative method of pre-positioning the metering piston is disclosed in connection with the alternative embodiment of the invention. Both output valves 101C and 101D are closed. One of the input valves, say 101A is opened, and the other input valve, say 101B, is closed. Re-circulation valve 507 is opened. The metering piston 109 moves in the cylinder 111 from left to right, forcing fluid from the right side of cylinder 111 through re-circulation valve 507 back to fluid storage container 151. At the same time, fluid from storage container 151 is pumped through input valve 101A into the left side of cylinder 111. In this way, the metering piston 109 can be pre-positioned within the cylinder 111 without passing fluid through the output valves 101C and 101D. When piston 109 is to be pre-positioned from right to left, input valve 101A is closed, input valve 101B is opened, re-circulation valve 507 is closed, recirculation valve 501 is opened, and both output valves 101C and 101D are closed. As piston 109 moves from right to left, fluid from the left side of cylinder 111 is forced through re-circulation valve 501 back into storage container 151, and fluid is pumped from container 151 through input valve 101B into the right side of cylinder 111. The operation of the other metering system (having re-circulation valves 511 and 519) during pre-positioning operation is the same.

In some applications, the volume of mixed material required for a single application, i.e., a single "shot" of material, is greater than the volume of the metering cylinders. In these situations, the pre-position mode of the present invention can also be used to position the metering pistons in the same position within their respective metering cylinders at the beginning of each application or "shot". By doing so, each shot of material will include the same number of "change-over strokes", i.e., changes of piston direction, and thus maintain a more uniform application of material.

The above-described invention can be used in connection with manual application of fluid to a work piece, such as an automobile or automobile component for example, or it can be used in connection with an automated application, such as in connection with a robot. For example, the metering and mixing system can be mounted to the end of a robot arm, and the movement of the robot arm can be electronically controlled, as is known in the art, to apply fluid to a work piece. When used in connection with a robot, it is preferable to that the controller 175 coordinate the movement of the robot arm with the movement of the metering pistons 109 and 129 such that a continuous and uniform bead of fluid is dispensed from the metering and mixing system onto the work piece. The above-described invention provides sufficient system control flexibility to enable such coordination. Further, the "double-acting" nature of the above-described invention, combined with the "pre-position" mode of operating the invention, minimizes preparation time (i.e., reloading and pre-positioning time) between the completion of one application, or "shot", of fluid, and the beginning of the next. Specifically, because the above-described invention preferably comprises "double-acting" metering cylinders, the respective metering pistons can be quickly pre-positioned to whichever end of the cylinder is closest to the piston when the previous fluid shot is complete. This is in contrast to a "single-acting" metering cylinder, wherein the metering piston would have to be pre-positioned at or near the same end of the metering cylinder each time. Accordingly, the preferred embodiment of the present invention is advantageous because it minimizes the downtime between fluid shots, thus increasing the efficiency of fluid applications.

A preferred embodiment of the present invention has been described hereinabove in a form that is suitable for dispensing a fluid material that is comprised of two components, such as a resin and a catalyst. However, a person skilled in the art will recognize that the present invention can be used in a variety of different forms, including a system having only one of the metering systems 200 or 201, which can be used for metering and dispensing a single component fluid. Similarly, the above-described invention can be used in connection with a system having any number of metering systems working together to mix multiple fluids together into a single mixed fluid. Other variations of the preferred embodiment also fall within the scope of the invention. Therefore, the following claims should be studied to determine the true scope and content of the invention.

What is claimed is:

1. A system for metering a fluid, comprising:
   a metering device;
   first and second input valves that actively control flow of the fluid into said metering device; and
   first and second output valves that actively control flow of the fluid from said metering device.

2. The system of claim 1, wherein said first metering device comprises a metering container having a pre-determined volume and a piston slidably disposed therein.

3. The system of claim 2, wherein said piston is actuated by a motor.

4. The system of claim 2, wherein said metering container is a cylinder.

5. The system of claim 2, wherein said first input valve controls flow of the fluid into said metering container on a first side of said piston; and wherein said second input valve controls flow of the fluid into said metering container on a second side of said piston.

6. The system of claim 1, wherein said first and second input valves and said first and second output valves are each two-way valves having an "off" state and an "on" state.

7. The system of claim 6, wherein said two-way valves are air-powered two-way ball valves.

8. The system of claim 1, further comprising an electronic controller that provides control signals to said first and second input valves and said first and second output valves to selectively open and close said valves.

9. The system of claim 1, further comprising at least one recirculation valve in fluid communication with said metering device, said recirculation valve controlling flow of the fluid from said metering device to a fluid storage container.

10. A system for mixing a multiple-part fluid having at least a first component fluid and a second component fluid, comprising:
    a first metering container having a first pre-determined volume;
    first and second input valves that actively control flow of the first component fluid into said first metering container;
    first and second output valves that actively control flow of the first component fluid from said first metering container;
    a second metering container having a second pre-determined volume;
    third and fourth input valves that actively control flow of the second component fluid into said second metering container; and
    third and fourth output valves that actively control flow of the second component fluid from said second metering container.

11. The system of claim 10, wherein said first and second input valves and said first and second output valves are each two-way valves having an "off" state and an "on" state.

12. The system of claim 11, wherein said two-way valves are air-powered two-way ball valves.

13. The system of claim 11, further comprising an electronic controller that provides control signals to said first, second, third and fourth input valves and said first, second, third and fourth output valves to selectively open and close said valves.

14. The system of claim 13, further comprising a first piston slidably disposed in said first metering container and a second piston slidably disposed in said second metering container; and a motor that actuates said first and second pistons in response to a control signal from said controller.

15. The system of claim 10, further comprising at least one recirculation valve in fluid communication with said first metering container, said recirculation valve controlling flow of the first component fluid from said first metering device to a fluid storage container.

16. A method of metering a fluid, comprising the steps of:
    selectively opening one of a first input valve and a second input valve to allow the fluid to flow into a metering device; and
    selectively opening one of a first output valve and a second output valve to allow the fluid to flow from said metering device.

17. The method of claim 16, wherein said metering device is a metering container having a pre-determined volume; and further comprising the step of actuating a piston to cause the fluid to flow from said metering container through said open output valve.

18. The method of claim 16, wherein said step of selectively opening one of a first input valve and a second input valve comprises causing a ball to be withdrawn from being seated in a valve mouth opening.

19. The method of claim 16, wherein said first input valve is opened and said second input valve is closed when said first output valve is closed and said second output valve is opened; and wherein said first input valve is closed and said second input valve is opened when said first output valve is opened and said second output valve is closed.

20. The method of claim 16, further comprising the step of sequencing the selective opening and closing of said input and output valves so as to avoid a straight through condition.

21. The method of claim 20, wherein said sequencing step comprises delaying the opening of said first input valve until said first output valve is closed, and delaying the opening of said second input valve until said second output valve is closed.

22. The method of claim 16, wherein the fluid is a first component fluid; and further comprising the steps of mixing said first component fluid with a second metered component fluid; and dispensing said mixed fluid.

23. A method of mixing a multiple-part fluid, comprising the steps of:

selectively opening one of a first input valve and a second input valve to allow a first component fluid to flow into a first metering container, said first metering container having a pre-determined volume;

selectively opening one of a third input valve and a fourth input valve to allow a second component fluid to flow into a second metering container, said second metering container having a pre-determined volume;

selectively opening one of a first output valve and a second output valve to allow said first component fluid to flow from said first metering container;

selectively opening one of a third output valve and a fourth output valve to allow said second component fluid to flow from said second metering container; and mixing said first and second component fluids.

24. The method of claim 23, wherein said step of selectively opening one of a first input valve and a second input valve comprises causing a ball to be withdrawn from being seated in a valve mouth opening.

25. The method of claim 24, wherein said first input valve is opened and said second input valve is closed when said first output valve is closed and said second output valve is opened; and wherein said first input valve is closed and said second input valve is opened when said first output valve is opened and said second output valve is closed.

26. The method of claim 23, further comprising the step of sequencing the selective opening and closing of said input and output valves so as to avoid a straight through condition.

27. The method of claim 26, wherein said sequencing step comprises delaying the opening of said first input valve until said first output valve is closed, and delaying the opening of said second input valve until said second output valve is closed.

28. A method of purging a metering system having first and second input valves that actively control flow of a fluid into a metering container and first and second output valves that actively control flow of the fluid from the metering container, comprising the steps of:

selectively opening the first input valve and the first output valve to cause a straight through condition on a first side of the metering container; and selectively opening the second input valve and the second output valve to cause a straight through condition on a second side of the metering container.

29. The method of claim 28, further comprising the step of routing the fluid from the metering container through the output valves and into a fluid storage reservoir.

30. In a metering system having first and second input valves that actively control flow of a fluid into a metering container, a piston slidably disposed in said metering container, and first and second output valves that actively control flow of the fluid from the metering container, a method of pre-positioning the piston in the metering container, comprising the steps of:

selectively closing the first and second output valves;

selectively opening the first and second input valves; and causing the piston to slide within the metering container to a desired position.

31. The method of claim 30, wherein a dispensing mechanism for dispensing the fluid is mounted to a movable robot arm, the movement of which is controlled by an electronic controller, and wherein the method further comprises the step of coordinating the movement of the robot arm with the movement of the piston to dispense a continuous and uniform bead of fluid.

32. A method of applying a bead of material to an automotive product, comprising the steps:

positioning a metering piston to a first pre-determined position within a metering container;

selectively opening one of a first input valve and a second input valve;

selectively opening one of a first output valve and a second output valve; and moving said metering piston within said metering container toward said open output valve to cause material to flow through said open output valve.

33. The method of claim 32, further comprising the step of re-positioning said metering piston to said first pre-determined position within said metering container.

34. The method of claim 32, further comprising the step of re-positioning said metering piston to a second pre-determined position within said metering container.

35. The method of claim 32, further comprising the step of positioning said metering piston within said metering container prior to the beginning of each separate application of material such that each application of material will have the same number of piston change-over strokes.

36. The method of claim 32, wherein said pre-determined position is near an end of said metering container.

* * * * *

UNITED STATES PATENT AND TRADEMARK OFFICE
CERTIFICATE OF CORRECTION

PATENT NO. : 6,840,404 B1
DATED : January 11, 2005
INVENTOR(S) : Carl L. Schultz et al.

It is certified that error appears in the above-identified patent and that said Letters Patent is hereby corrected as shown below:

Column 12,
Line 56, please insert the following:
-- 37. In a metering system having first and second input valves that control flow of a fluid into a metering container, a piston slidably disposed in said metering container, first and second output valves that control flow of the fluid from the metering container, and at least one recirculation valve that controls flow of the fluid from the metering container to a fluid storage container, a method of pre-positioning the piston in the metering container, comprising the steps of:
    closing said first and second output valves;
    closing first input valve;
    opening said second input valve;
    opening said recirculation valve; and
        causing said piston to slide within said metering container to a desired position. --

Signed and Sealed this

Seventeenth Day of May, 2005

JON W. DUDAS
*Director of the United States Patent and Trademark Office*